(12) United States Patent
Birkert et al.

(10) Patent No.: US 10,370,897 B2
(45) Date of Patent: Aug. 6, 2019

(54) LINEAR ACTUATOR EXTENSION FOR BARRIER ASSEMBLY

(71) Applicant: MUNCHKIN, INC., Van Nuys, CA (US)

(72) Inventors: Thomas E. Birkert, West Hills, CA (US); Sung Yun Chan, Pasadena, CA (US); Nicholas Trumbo, La Canada, CA (US)

(73) Assignee: Munchkin, Inc., Van Nuys, CA (US)

( * ) Notice: Subject to any disclaimer, the term of this patent is extended or adjusted under 35 U.S.C. 154(b) by 0 days.

(21) Appl. No.: 14/880,125

(22) Filed: Oct. 9, 2015

(65) Prior Publication Data

US 2016/0245381 A1 Aug. 25, 2016

Related U.S. Application Data

(60) Provisional application No. 62/120,797, filed on Feb. 25, 2015.

(51) Int. Cl.
| | |
|---|---|
| *E06B 9/04* | (2006.01) |
| *F16H 25/20* | (2006.01) |
| *E06B 9/02* | (2006.01) |
| *E06B 9/06* | (2006.01) |
| *E06B 9/00* | (2006.01) |

(52) U.S. Cl.
CPC .................. *E06B 9/04* (2013.01); *E06B 9/02* (2013.01); *E06B 9/06* (2013.01); *E06B 9/0615* (2013.01); *F16H 25/20* (2013.01); *E06B 2009/002* (2013.01); *F16H 2025/209* (2013.01); *F16H 2025/2031* (2013.01)

(58) Field of Classification Search
CPC .................................................. E06B 2009/002
See application file for complete search history.

(56) References Cited

U.S. PATENT DOCUMENTS

| | | | | |
|---|---|---|---|---|
| 2,403,096 | A * | 7/1946 | Slavic | F16H 1/163 74/424.87 |
| 2,511,372 | A * | 6/1950 | Price | E06B 9/02 160/224 |
| 2,756,469 | A * | 7/1956 | Cattermole | E06B 9/02 49/465 |
| 3,163,205 | A * | 12/1964 | Gottlieb | E06B 9/01 160/216 |

(Continued)

FOREIGN PATENT DOCUMENTS

| | | | | |
|---|---|---|---|---|
| EP | 0833033 A3 * | 11/1998 | | E06B 9/02 |
| WO | 03074826 | 9/2003 | | |

OTHER PUBLICATIONS

International Search Report, dated Jan. 20, 2016, pp. 1-3.

(Continued)

*Primary Examiner* — Marcus Menezes
(74) *Attorney, Agent, or Firm* — Robert Z. Evora, Esq.

(57) ABSTRACT

A linear actuator extension assembly having a base housing, a driving member and a driven member having a housing. The driving member has a driving surface and a threaded lead screw disposed within the base housing. The driving surface is rotated about a first axis to actuate the threaded lead screw, thereby rotating the threaded lead screw about a second axis substantially orthogonal to the first axis. The rotation of the threaded lead screw translates the driven member housing relative to the base housing.

18 Claims, 18 Drawing Sheets

(56) References Cited

U.S. PATENT DOCUMENTS

| | | | | |
|---|---|---|---|---|
| 5,804,938 | A * | 9/1998 | Richmond | G05B 19/23 318/282 |
| 5,809,833 | A * | 9/1998 | Newport | F16H 25/20 192/141 |
| 7,040,056 | B2 * | 5/2006 | DuBose | E05D 15/0665 49/116 |
| 8,627,602 | B2 * | 1/2014 | Yates | E06B 9/04 49/55 |
| 2005/0210749 | A1 * | 9/2005 | DuBose | E05D 15/0665 49/118 |
| 2009/0071074 | A1 * | 3/2009 | Yates | E06B 9/04 49/55 |
| 2009/0107051 | A1 | 4/2009 | Talpe | |
| 2011/0302841 | A1 | 12/2011 | Ye et al. | |
| 2012/0222509 | A1 * | 9/2012 | Winther | F16H 25/20 74/89 |
| 2013/0118088 | A1 * | 5/2013 | Yates | E05B 65/0007 49/386 |

OTHER PUBLICATIONS

Written Opinion of the International Searching Authority, dated Jan. 20, 2016, pp. 1-6.
Search History, Search Date Dec. 24, 2015, pp. 1-5.
European Patent Office Search Report and Search Opinion for PCT/US2015059100, dated Oct. 29, 2018. (pp. 9).

* cited by examiner

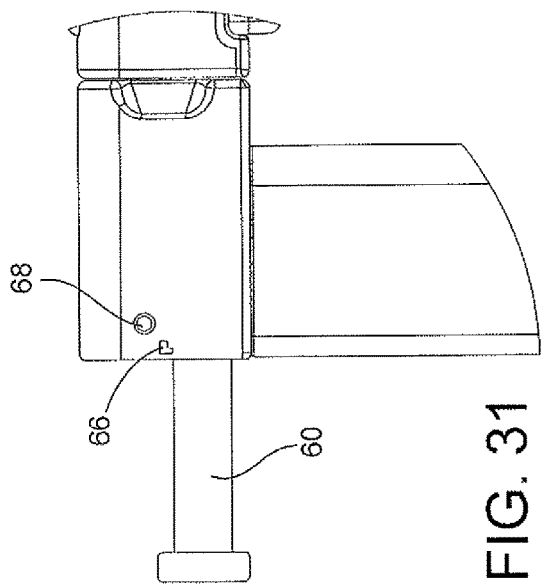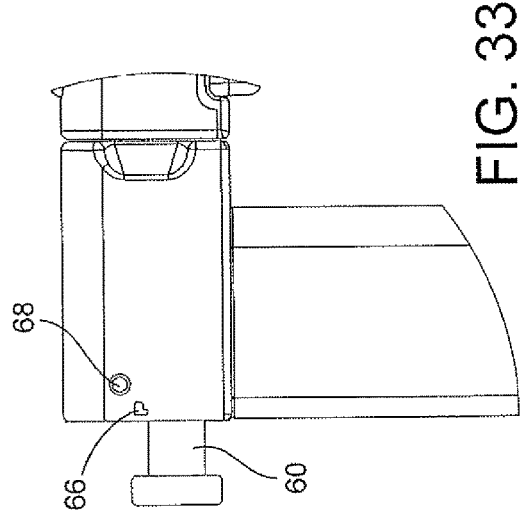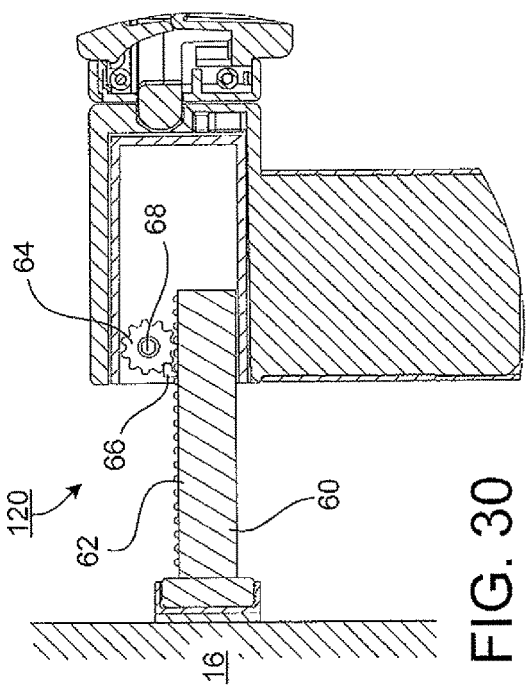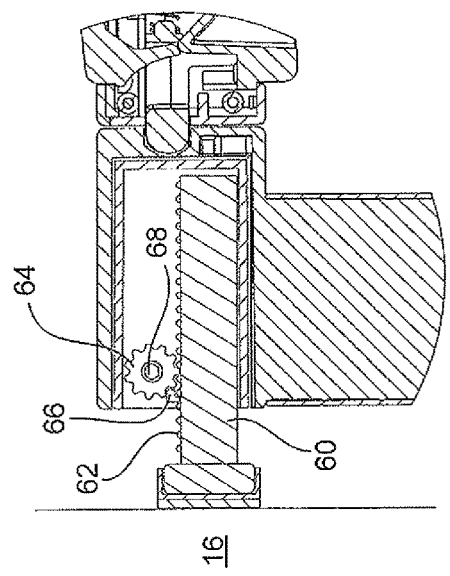

LINEAR ACTUATOR EXTENSION FOR BARRIER ASSEMBLY

CROSS REFERENCE TO RELATED APPLICATIONS

The application claims priority to U.S. Provisional Patent Application Ser. No. 62/120,797, filed Feb. 25, 2015, the contents of which are hereby incorporated by reference herein in its entirety into this disclosure.

TECHNICAL FIELD

The subject disclosure relates to barrier assemblies. More particularly, the present disclosure relates to linear actuator extensions for barrier assemblies.

BACKGROUND

Falls are a leading cause of injuries to children and toddlers in the home. Safety gates can be used around the home to prevent children from entry into a staircase region or keep the children in a safe area in the home where they can be watched by a caregiver. Additionally, safety gates can be used to prevent movement of small household pets into unwanted spaces or rooms. Securing the safety gates poses many challenges, including ease of installation and connection strength. Accordingly, there is a need for the development of a safety gate that can easily be installed and provides a secure installation.

BRIEF DESCRIPTION OF DRAWINGS

FIGS. 30-33 show another exemplary linear actuator extension having a gear rack and pinion structure.

DETAILED DESCRIPTION

Figure 1:
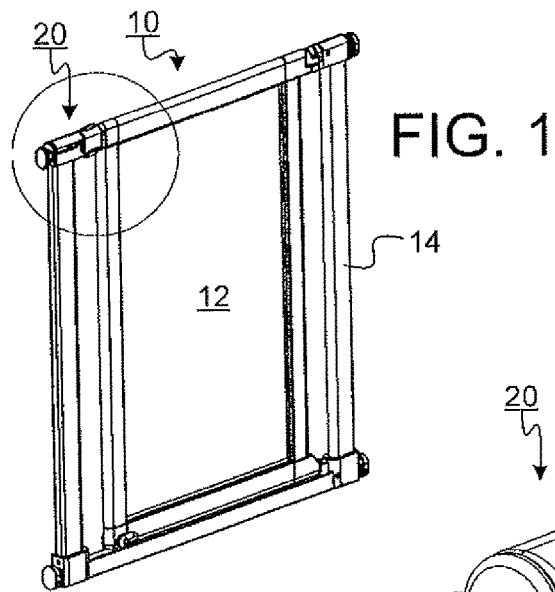
FIG. 1 illustrates an exemplary barrier assembly having a linear actuator extension in accordance with aspects described herein.

The subject disclosure is described with reference to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details.

FIG. 1 illustrates the exemplary barrier assembly 10. The barrier assembly 10 includes a barrier door 12, frame 14 and linear actuator extensions 20. When the barrier assembly 10 is installed between two opposing surfaces, the linear actuator extensions 20 will be press fit against either surface to prevent movement of the frame 14.

Figure 2:
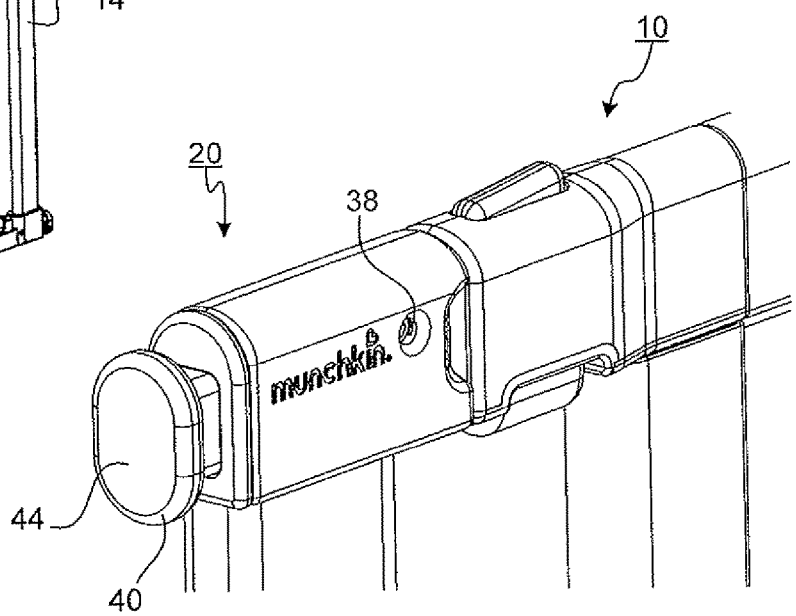
FIG. 2 depicts an enlarged perspective view of the barrier assembly with the linear actuator extension in a retracted position.
Figure 3:
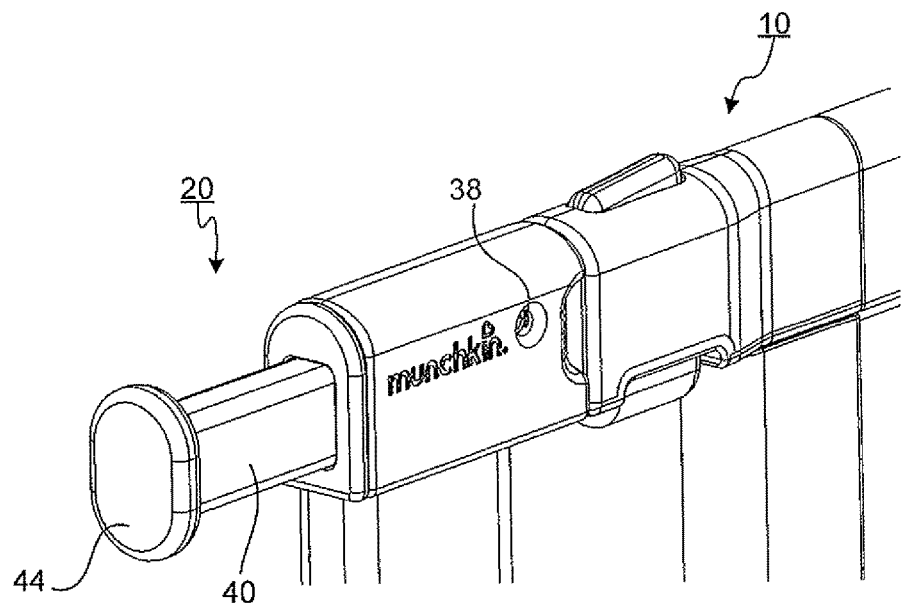
FIG. 3 shows an enlarged perspective view of the barrier assembly with the linear actuator extension in an extended position.

FIGS. 2-3 depict an enlarged perspective view of the linear actuator extension 20 installed within the barrier assembly 10. Generally, the linear actuator extension 20 may have a driven member 40 and compressible pad 44. FIG. 2 illustrates the linear actuator extension 20 in a retracted position. As a driving surface 38 of the linear actuator extension 20 is rotated, the driven member 40 will extend laterally outwards from the barrier assembly 10, as further described below. FIG. 3 shows the linear actuator extension 20 in an extended position. It is to be understood that there are many configurations of the driving surface 38 and driven member 40 capable of performing the functions of the subject disclosure.

Figure 4:
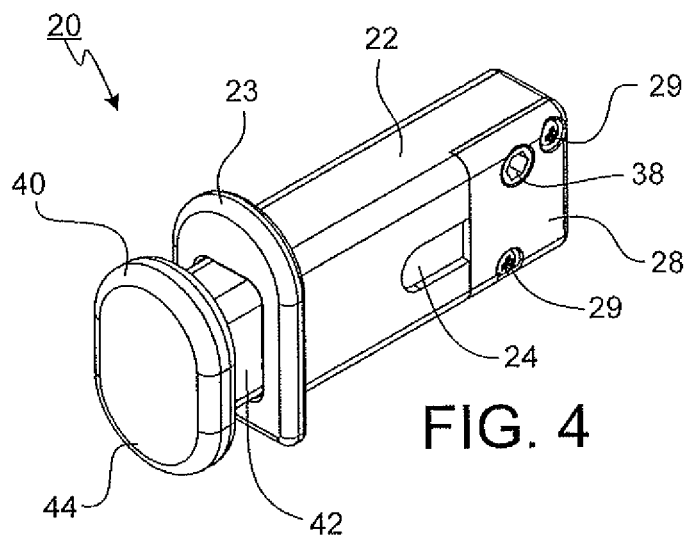
FIG. 4 illustrates a perspective view of the linear actuator extension in the retracted position.
Figure 5:
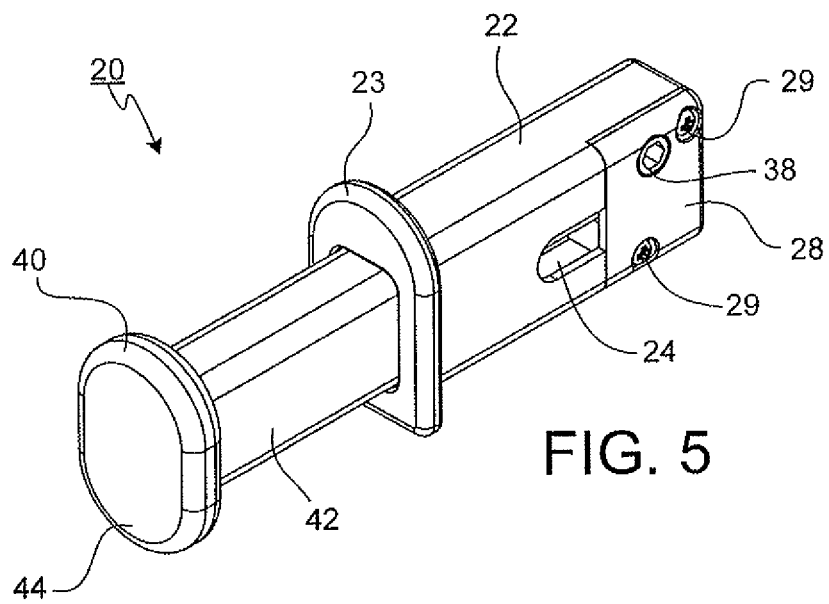
FIG. 5 depicts a perspective view of the linear actuator extension in the extended position.

FIGS. 4-5 show perspective views of the linear actuator extension 20 in both the retracted position in FIG. 4 and the extended position in FIG. 5. The linear actuator extension 20 includes a base housing 22, having a first end 22a and a second end 22b, and driven member 40. As shown, the base housing 22 may further includes a housing shelf 23, which rests against the frame 14 of the barrier assembly 10, as depicted in FIGS. 2-3. The housing shelf 23 may be in the form of a platform that extends orthogonal to and away from the second end 22b of the base housing 22. The housing shelf 23 may have an upper rounded portion 23a and lower rectangular portion 23b, but may take on a variety of shapes and sizes. The housing shelf 23 may be congruent to an outer portion of the frame 14 such that when the linear actuator extension 20 is installed within the barrier assembly 10, an outer edge of the housing shelf 23 is flush with an outer edge of the frame 14. The base housing 22 may also be an integral part of the frame 14 of the barrier assembly 10.

Figure 6:
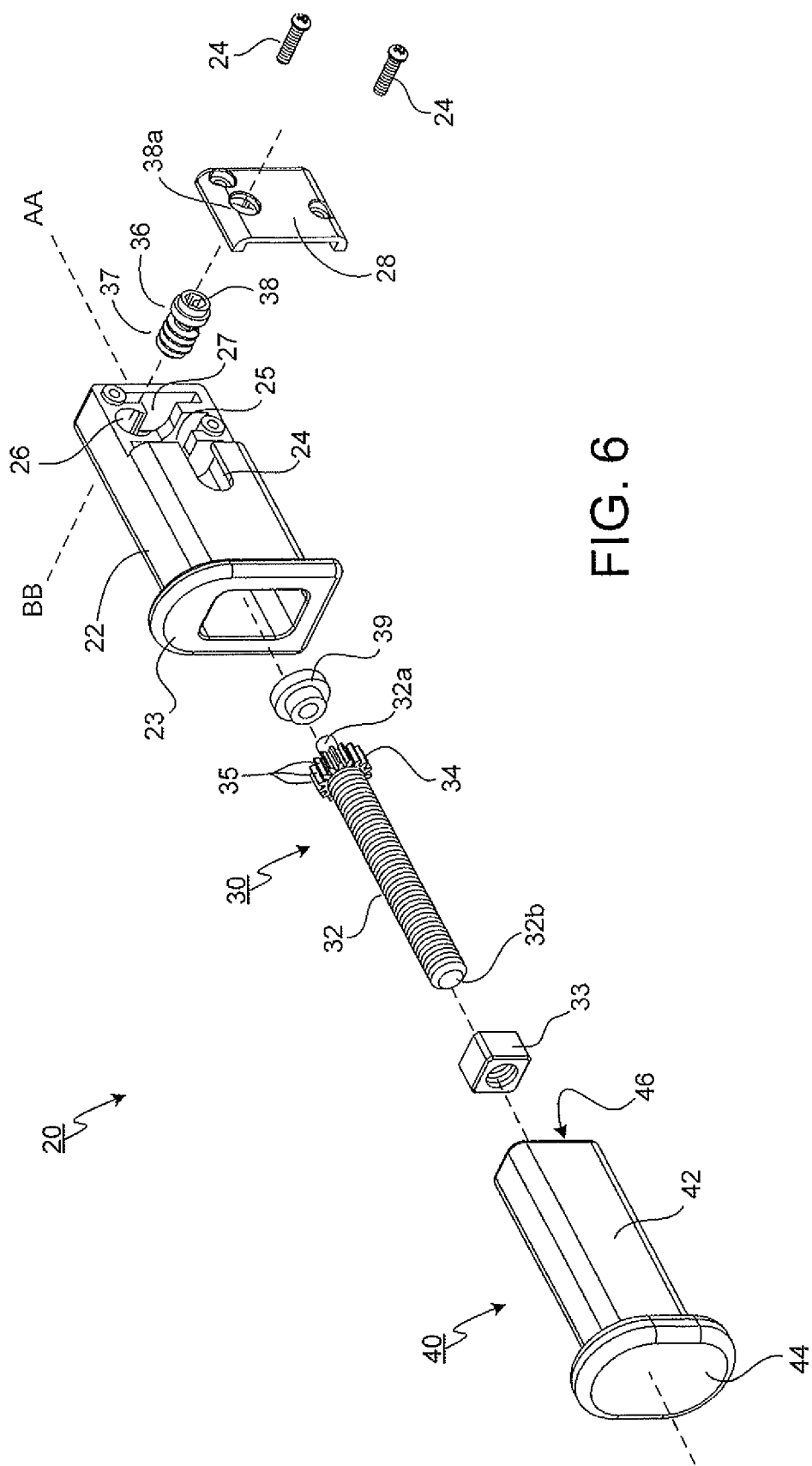
FIG. 6 shows an exploded view of the linear actuator extension.

FIG. 6 illustrates an exploded view of the linear actuator extension 20 having the base housing 22, a driving member 30 and the driven member 40.

The driving member 30 may include a threaded lead screw 32, a lead screw nut 33, a worm gear 34, a worm 36, the driving surface 38 and a cap 39. In general, a user may engage the driving surface 38 to rotate the worm 36. As the worm 36 rotates, spiral teeth 37 will engage teeth 35 of the worm gear 34 and rotate the threaded lead screw 32. The rotating threaded lead screw 32 will thereby engage the threads within the lead screw nut 33 and longitudinally translate the lead screw nut 33 along an axis AA running coaxially through the lead screw 32. As will be described in more detail, the lead screw nut 33 is restrained both longitudinally and rotationally within a cavity 46 of the driven member 40. Accordingly, rotating the lead screw 32 will drive the lead screw nut 33 and the driven member 40 to move longitudinally relative to the lead screw 32 and to the base housing 22.

The driven member 40 will travel a predetermined distance in response to a complete rotation of the driving surface 38. The distance depends upon the thread count of the worm 36 and the threaded lead screw 32.

The base housing 22 may include the housing shelf 23, an aperture 24, a gear recess 25, a worm recess 26, a cap recess 27, a cover 28 and fasteners 29. The gear recess 25 may be adapted to receive the worm gear 34 and allow for rotational movement of the worm gear 34 and lead screw 32. Furthermore, the gear recess 25 may also restrict longitudinal movement of the worm gear 34 and lead screw 32 with respect to the base housing 22. The gear recess 25 may have projections extending from the base housing 22 inwards, which rest against the worm gear 34. These projections may form an opening with a diameter approximately an outer diameter of the lead screw 32, which is smaller than an outer diameter of the worm gear 34.

The worm recess 26 may receive the worm 36 and allow the worm 36 to rotate in place while engaging the worm gear 34. The cover 28 may restrict lateral movement of the worm 36.

The cap recess 27 may be adapted to receive a cap 39. The cap 39 may receive a first end portion 32a of the lead screw 32 such that the lead screw 32 is free to rotate about a shared axis. The cap 39 may provide additional support for the lead screw 32.

The cover 28 may be provided to further retain the driving member 30 within the base housing 22. The cover 28 may have an aperture 38a which may receive a portion of the worm 36 and/or the driving surface 38. In this configuration, the driving surface 38 is accessible while the cover 28 is attached to the base housing 22. The cover 28 may also comprise a number of complimentary recesses (not shown) which align with the gear recess 25, worm recess 26 and cap recess 27.

The cover 28 may be attached to the base housing 22 by any number of fasteners 29. The fasteners 29 may be threaded screws, bolts, snap inserts, latches, pins, rivets or any other suitable fastening device. The fasteners 29 may be located on any surface of either the cover 28 or the base housing 22. The fasteners 29 may also comprise a hinge with a clasping mechanism.

Figure 7:
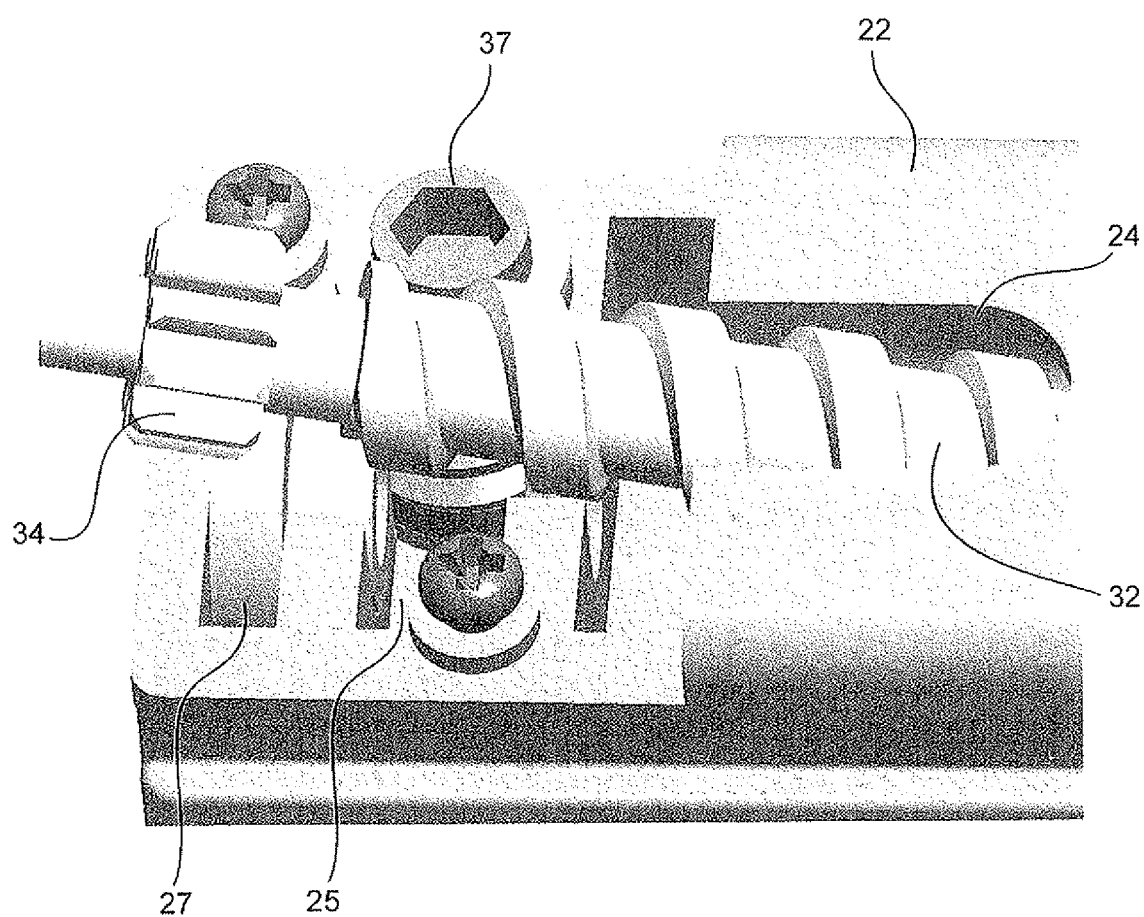
FIG. 7 illustrates an enlarged perspective view of installing a lead screw into a base housing of the linear actuator extension.

FIG. 7 depicts installing the lead screw 32 into the base housing 22 with the cover 28 removed. A second end 32b of the lead screw 32 is inserted into the base housing 22 through the aperture 24 until the worm gear 34 is in alignment with the gear recess 25 and the cap 39 is in alignment with the cap recess 27. The aperture 24 allows the lead screw 32 to be inserted at a greater incident angle, which permits the worm gear 34 and cap 39 to clear the recesses 25, 27. Once in alignment, the lead screw 32 is pushed down into the base housing 22. The worm 36 is then installed into the worm recess 26 of the base housing 22. As the worm 36 is inserted into the worm recess 26, the spiral teeth 37 may engage the teeth 35 of the worm gear 34. The worm gear 34 will rotate, thereby allowing the worm recess 26 to receive the worm 36.

Figure 8:
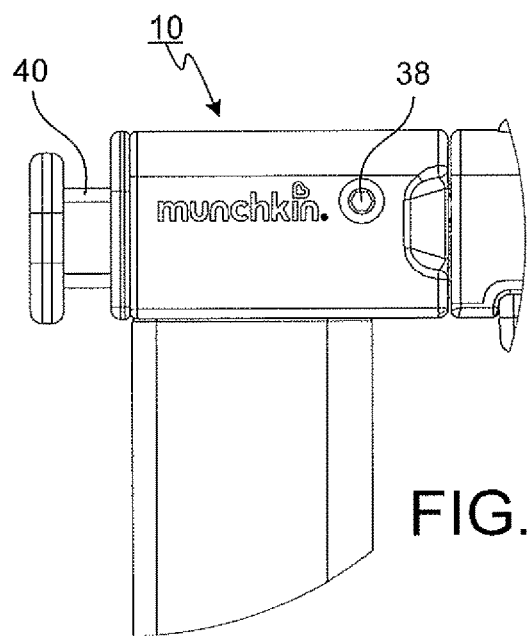
FIG. 8 depicts an enlarged front view of the barrier assembly with the linear actuator extension in the retracted position.
Figure 9:
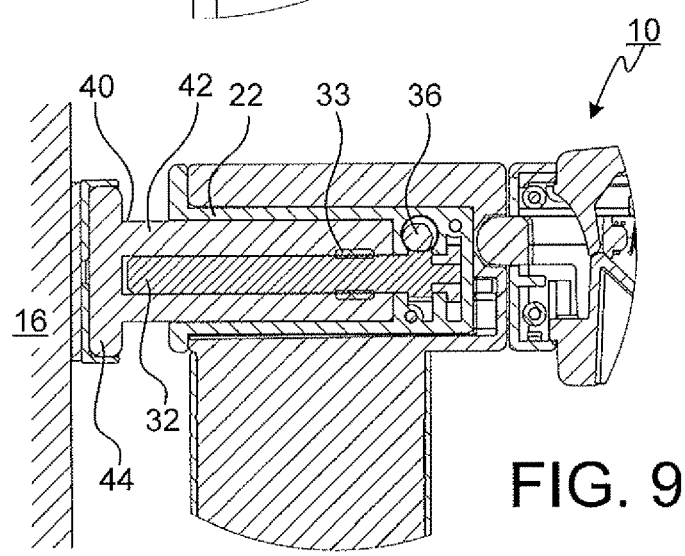
FIG. 9 shows a front cross section view of the barrier assembly with the linear actuator extension in the retracted position.
Figure 10:
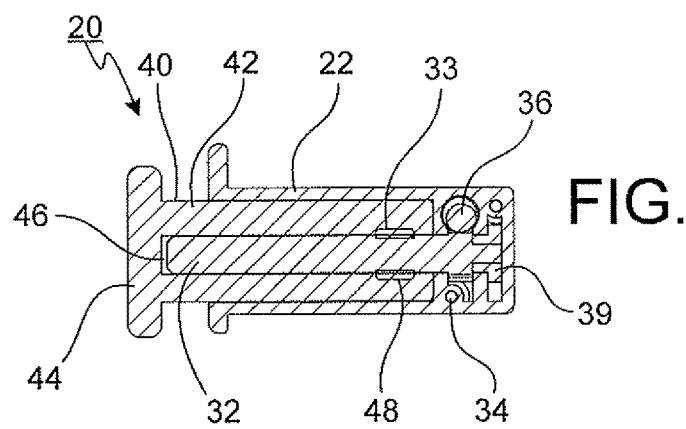
FIG. 10 illustrates a front cross section view of the linear actuator extension in the retracted position.

FIGS. 8-10 illustrate the linear actuator extension 20 in the retracted position. FIG. 8 depicts a front view of the linear actuator extension 20 as installed within the barrier assembly 10. FIGS. 9-10 show cross section views thereof. As shown, the compressible pad 44 may rest up against a wall 16. In the retracted position, the linear actuator extension 20 of the barrier assembly 10 may be uninstalled, in which case there will be minimal tension between the wall 16, compression pad 44, driven member 40 and base housing 22.

The driven member 40 has the cavity 46 which includes an internal recess 48 adapted to receive and secure the lead screw nut 33. The lead screw nut 33 is rotationally and longitudinally fixed relative to the driven member 40.

Figure 11:
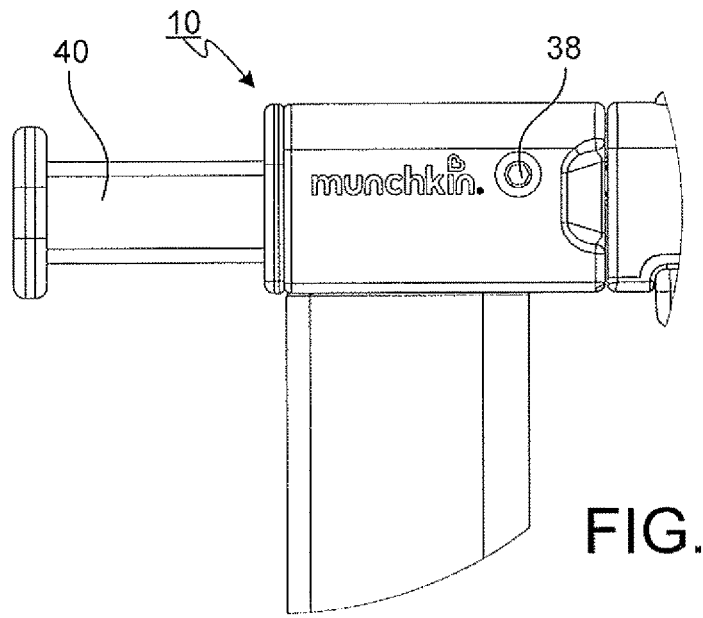
FIG. 11 depicts an enlarged front view of the barrier assembly with the linear actuator extension in the extended position.
Figure 12:
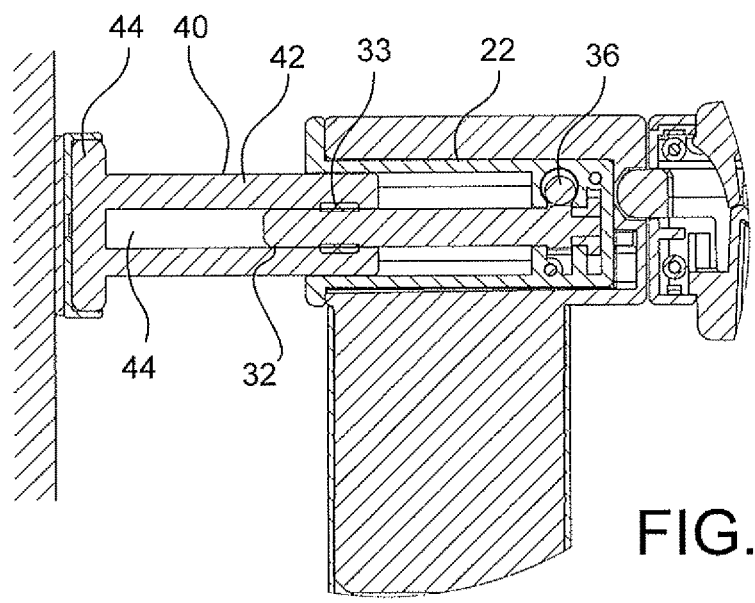
FIG. 12 shows a front cross section view of the barrier assembly with the linear actuator extension in the extended position.
Figure 13:
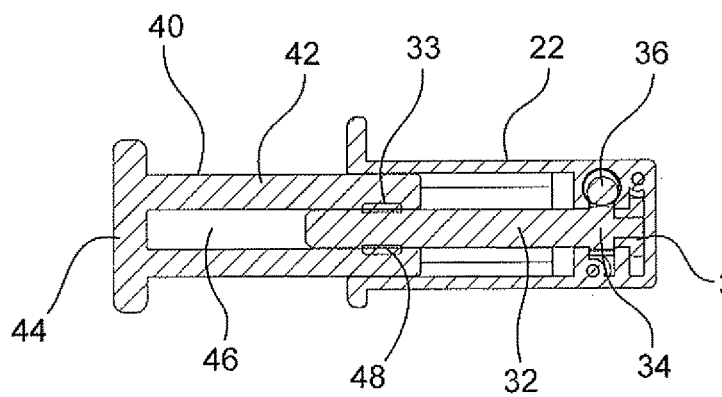
FIG. 13 illustrates a front cross section view of the linear actuator extension in the extended position.
Figure 14:
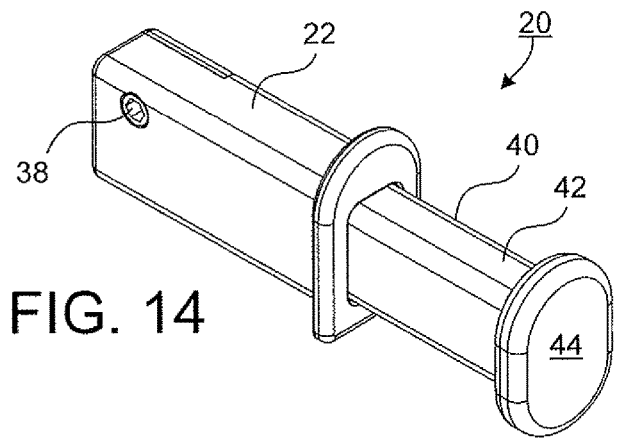
FIG. 14 depicts a perspective view of the linear actuator extension.
Figure 15:
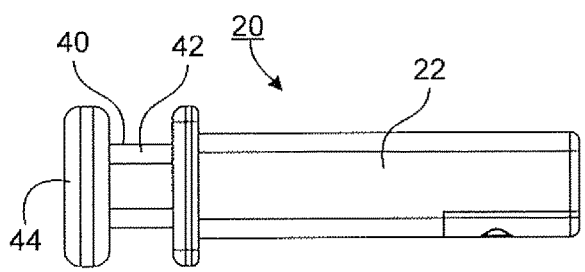
FIG. 15 shows a top view of the linear actuator extension.
Figure 16:
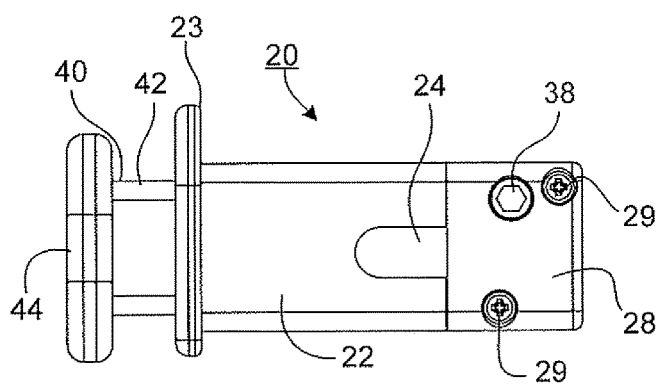
FIG. 16 illustrates a front view of the linear actuator extension.
Figure 17:
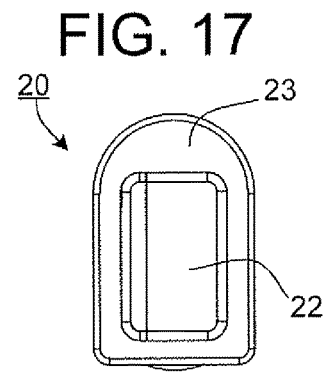
FIG. 17 depicts a right side view of the linear actuator extension.
Figure 18:
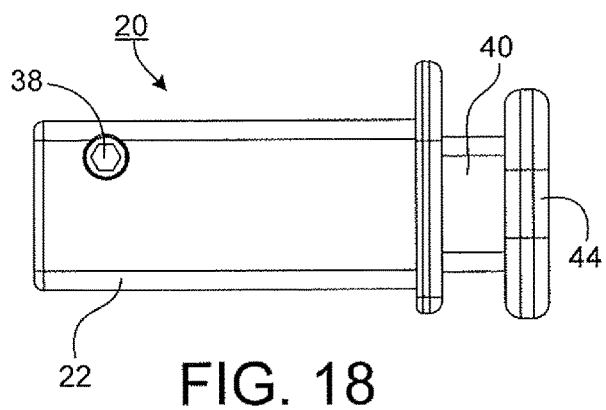
FIG. 18 shows a rear view of the linear actuator extension.
Figure 19:
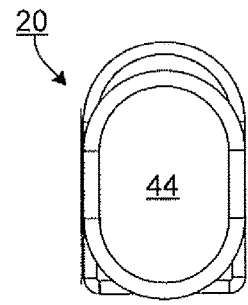
FIG. 19 illustrates left side view of the linear actuator extension.
Figure 20:
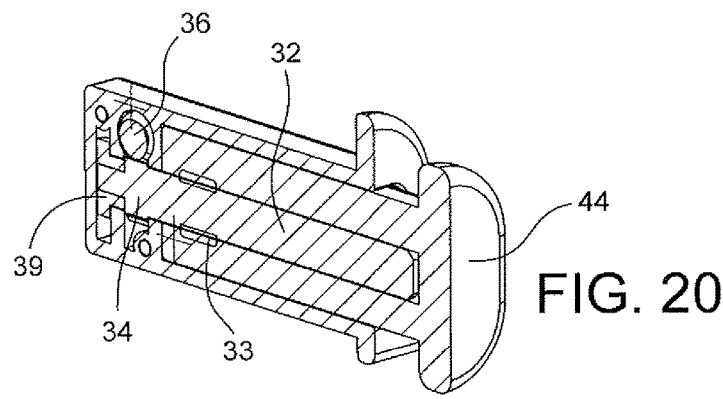
FIG. 20 depicts a perspective cross section view of a mirrored linear actuator extension in the retracted position.

FIGS. 11-13 illustrate the linear actuator extension 20 in the extended position. FIG. 11 depicts a front view of the linear actuator extension 20 as installed within the barrier assembly 10. FIGS. 12-13 show cross section views thereof. In the extended position, if the barrier assembly 10 is installed, the linear actuator extension 20 will apply a pressure on the wall 16. The pressure may be distributed throughout the compression pad 44, the driven member housing 42, the lead screw nut 33 and lead screw 32, as well as the base housing 22. The lead screw 32 may be prevented from rotating due to the teeth 35 of the worm gear 34 abutting against the spiral teeth 37 of the worm 36.

Figure 21:
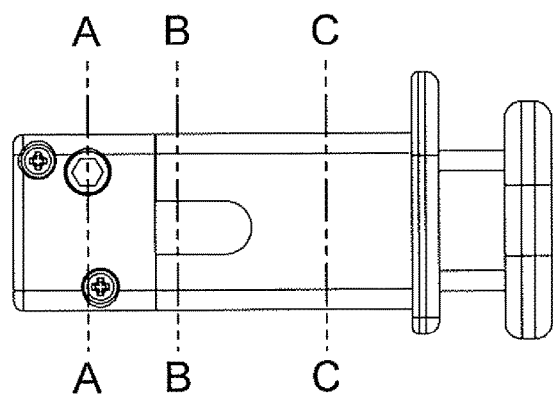
FIG. 21 shows a front view of the linear actuator extension in the retracted position.
Figure 22:
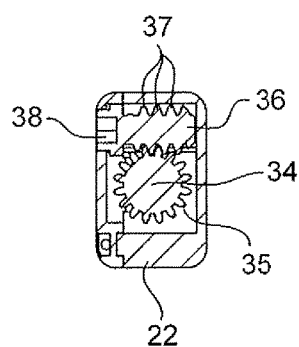
FIG. 22 illustrates a cross section view of the linear actuator extension in the retracted position about line A-A in FIG. 21.
Figure 23:
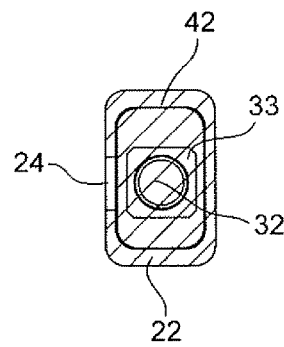
FIG. 23 depicts a cross section view of the linear actuator extension in the retracted position about line B-B in FIG. 21.
Figure 24:
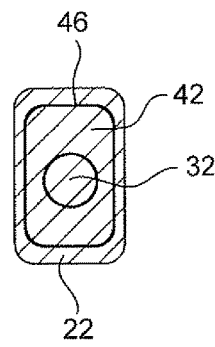
FIG. 24 shows a cross section view of the linear actuator extension in the retracted position about line C-C in FIG. 21.

FIGS. 14-20 depict various views of the linear actuator extension 20. FIGS. 22-24 illustrate cross section views of the linear actuator extension 20 in the retracted position about lines A-A, B-B and C-C respectively in FIG. 21. FIG. 22 shows a cross section view of the engagement between the worm 36 and worm gear 34. As the driving surface 38 is rotated, the spiral teeth 37 of the worm 36 drive the rotation of the worm gear 34 by contacting the teeth 35.

FIG. 23 shows a cross section view of the lead screw 32 engaging the lead screw nut 33 contained within the driven member housing 42. FIG. 24 depicts a cross section view of the lead screw 32 contained within the cavity 46 of the driven member housing 42.

Figure 25:
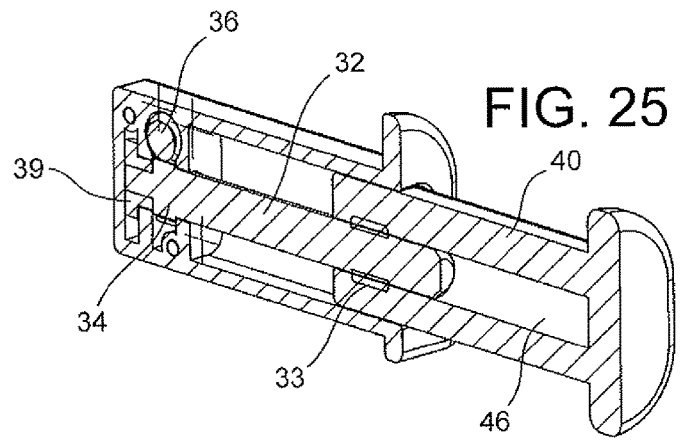
FIG. 25 illustrates a perspective cross section view of a mirrored linear actuator extension in the extended position.

FIG. 25 illustrates a perspective cross section view of a mirrored linear actuator extension in the retracted position.

Figure 26:
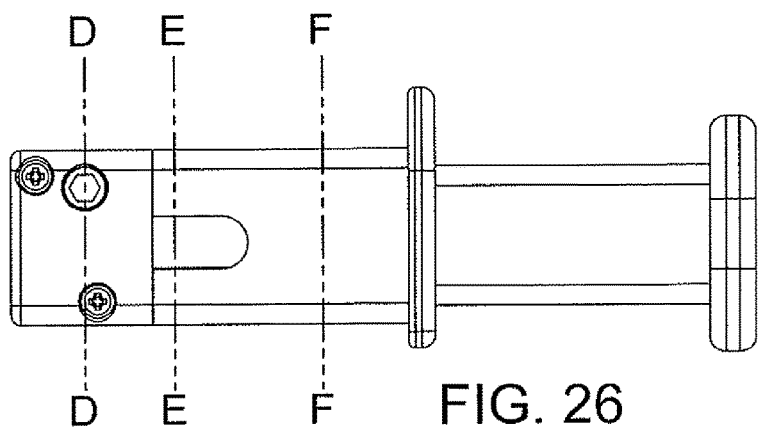
FIG. 26 depicts a front view of the linear actuator extension in the extended position.
Figure 27:
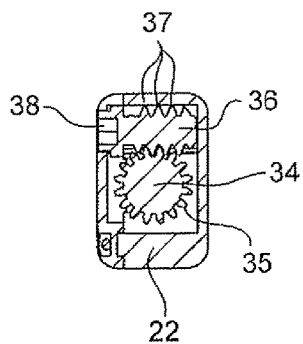
FIG. 27 shows a cross section view of the linear actuator extension in the extended position about line D-D in FIG. 26.
Figure 28:
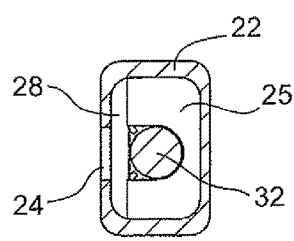
FIG. 28 illustrates a cross section view of the linear actuator extension in the extended position about line E-E in FIG. 26.
Figure 29:
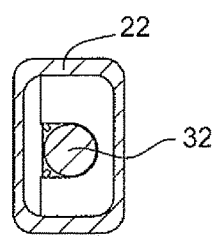
FIG. 29 depicts a cross section view of the linear actuator extension in the extended position about line F-F in FIG. 26.
Figure 34:
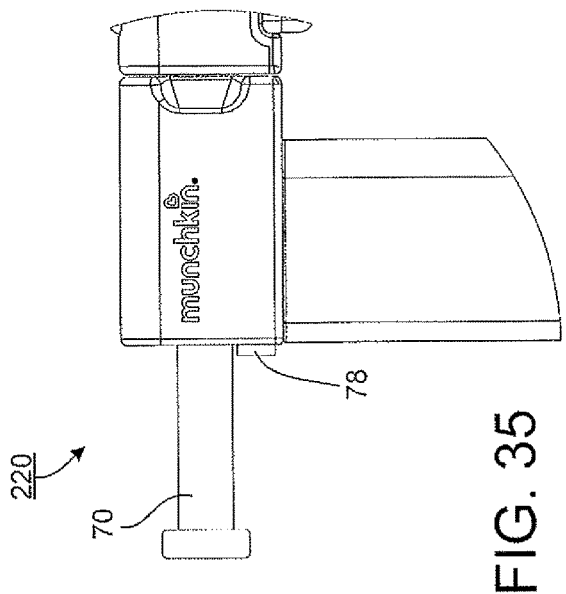
FIGS. 34-37 illustrate another exemplary linear actuator extension having a gear rack and worm below the driven member.
Figure 35:
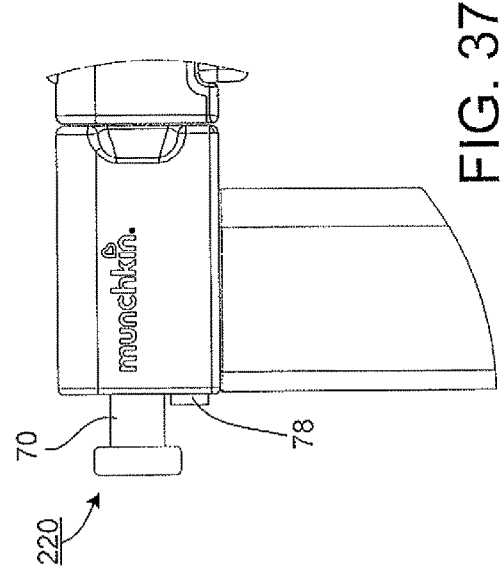
Figure 36:
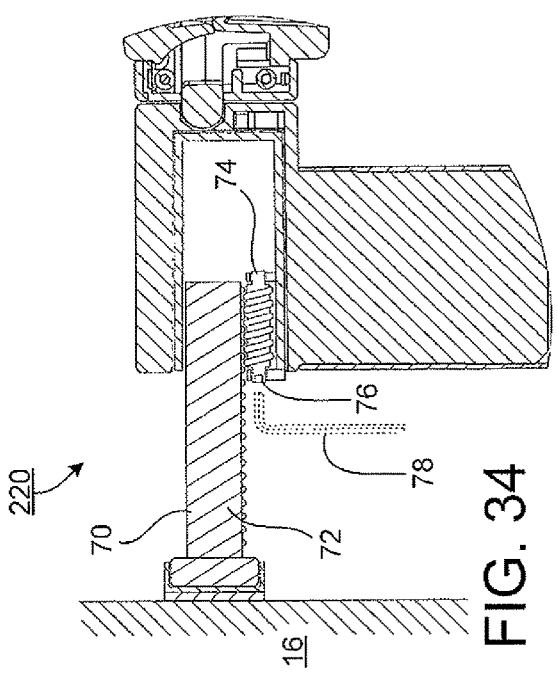
Figure 37:
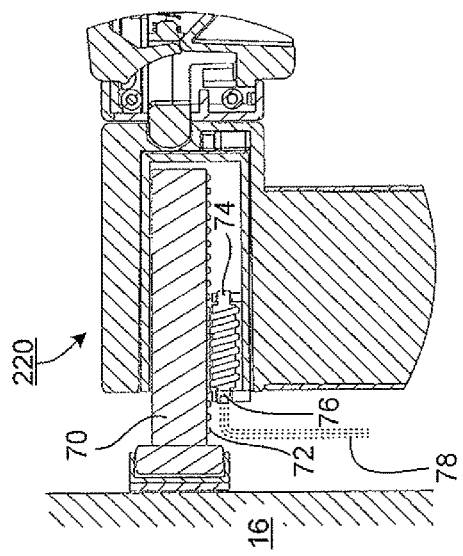
Figure 39:
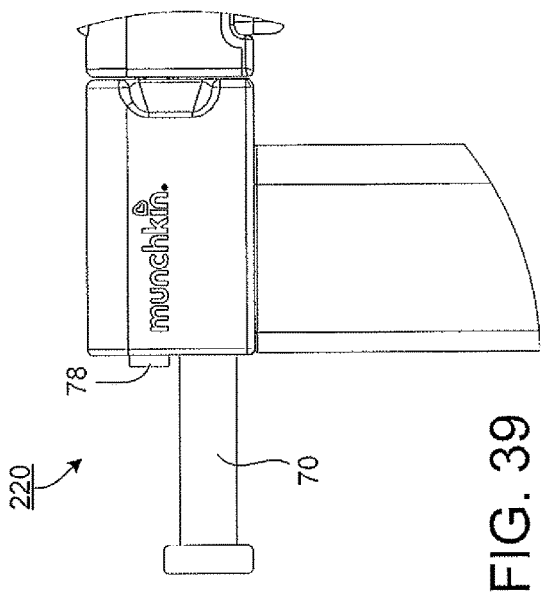
FIGS. 38-41 depict another exemplary linear actuator extension having a gear rack and worm above the driven member.
Figure 41:
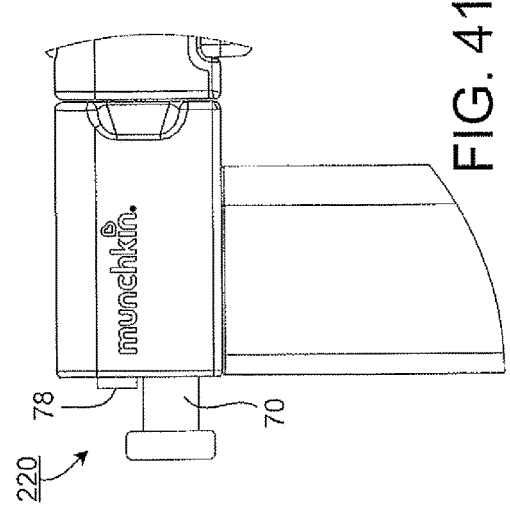
Figure 38:
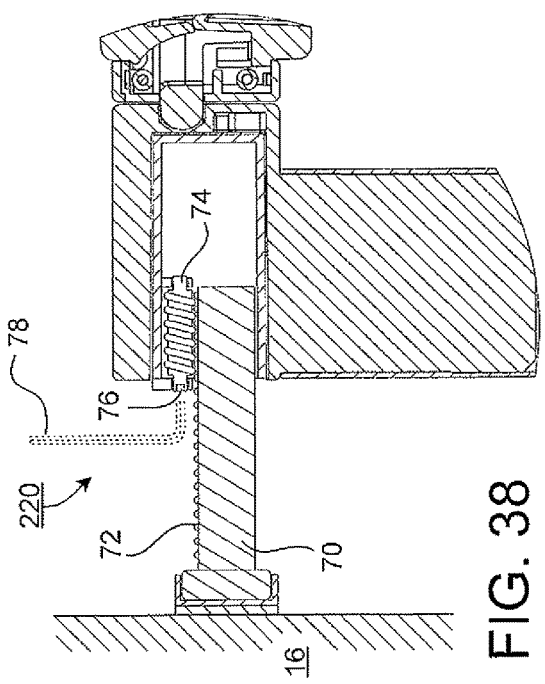
Figure 40:
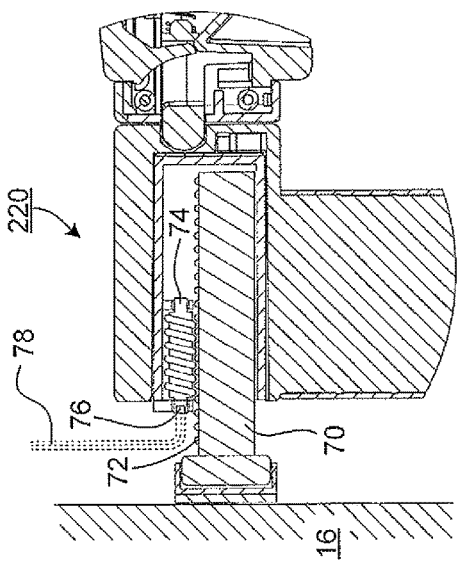
Figure 43:
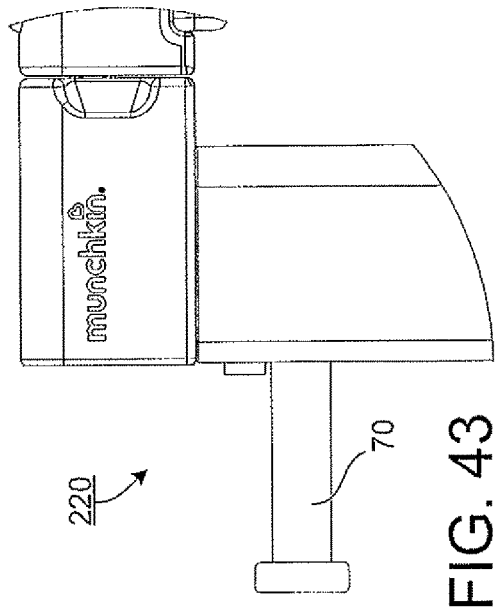
FIGS. 42-45 show another exemplary barrier assembly having the linear actuator extension installed in an upper portion of a frame member.
Figure 45:
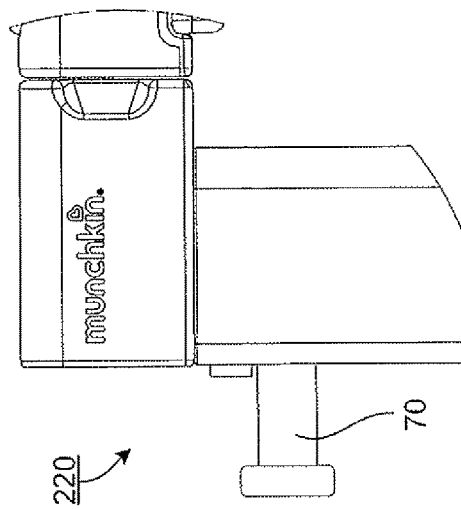
Figure 42:
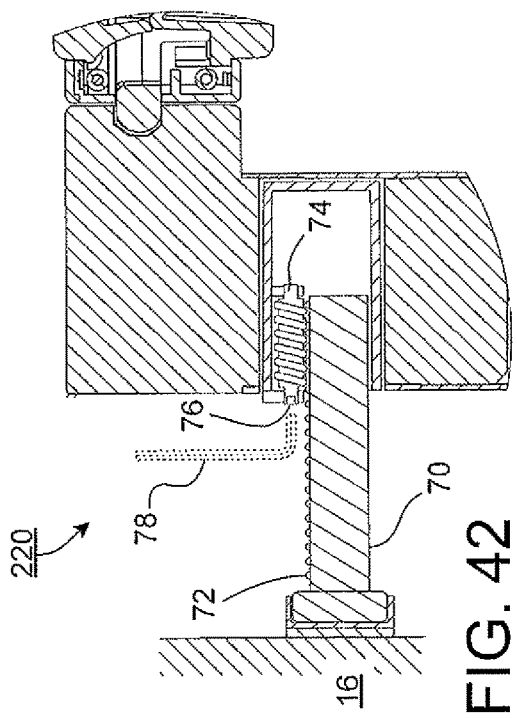
Figure 44:
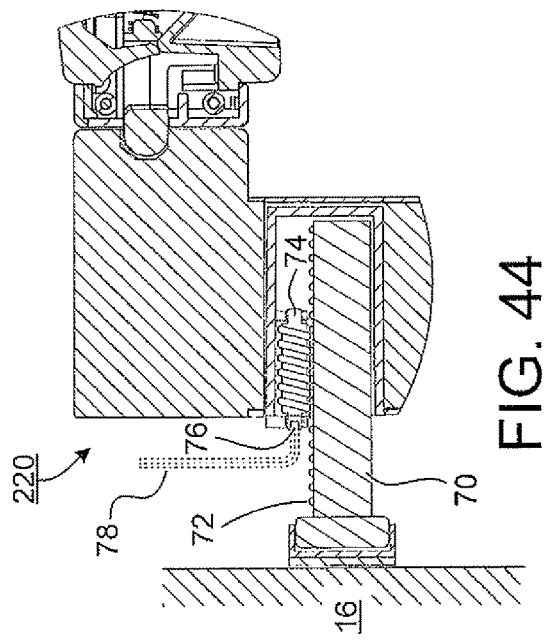

FIGS. 27-29 depict cross section views of the linear actuator extension 20 in the extended position about lines D-D, E-E and F-F respectively in FIG. 26. FIG. 27 shows a cross section view of the engagement between the worm 36 and worm gear 34, as described above and in FIG. 22.

FIGS. 28-29 illustrate cross section views of the lead screw 32 within the base housing 22. As shown, the lead screw 32 may be held in place within a cavity defined by the cover 28 and a portion of the base housing 22, which defines the worm gear recess 25.

FIGS. 30-33 show another exemplary linear actuator extension 120 having a gear rack and pinion structure. The linear actuator extension 120 includes a driven member 60, a gear rack 62, a pinion gear 64, a ratchet mechanism 66 and a driving surface 68. As shown, a user rotates the driving surface 68, thereby causing the pinion gear 64 to engage and actuate the gear rack 62. As the wall 16 exerts pressure on the driven member 60, the ratchet mechanism 66 prevents the gear rack 62 from moving from an extended position to a retracted position by preventing the pinion gear 64 from rotating.

FIGS. 34-37 illustrate another exemplary linear actuator extension 220 having a gear rack 72 and worm 74 below a driven member 70. A user would use a driver 78 to engage a driving surface 76 of the worm 74 to rotate the worm 74. The rotating worm 74 contacts the gear rack 72 causing the driven member to extend in or out of the base housing of the linear actuator extension 220. Again, as previously described, an advantage of the gear rack and worm system is to prevent the driven member 70 from retracting under pressure when the barrier assembly is in an installed position, due to the spiral teeth of the worm 74 preventing the longitudinal motion of the gear rack 72.

FIGS. 38-41 depict another exemplary linear actuator extension having a gear rack and worm gear above the driven member. The linear actuator extension 220 operates in a manner as described above, however here the gear rack 72 and worm 74 are above the driven member 70.

FIGS. 42-45 show another exemplary barrier assembly having the linear actuator extension installed in an upper portion of a frame member. As shown, the linear actuator extension may be installed in various positions throughout the barrier assembly. The linear actuator extension may be built as a separate unit as shown in FIGS. 4-5 or it may be integrated directly into the frame of the barrier assembly. Furthermore, the driving surface that allows the user to extend or retract the driven member may be placed in a wide variety of orientations as shown and described. In addition, the driving surface for the linear actuator extension may be manually operated or automatically operated by a driver, wrench, ratchet, motor or other suitable driving mechanism.

Figure 46:
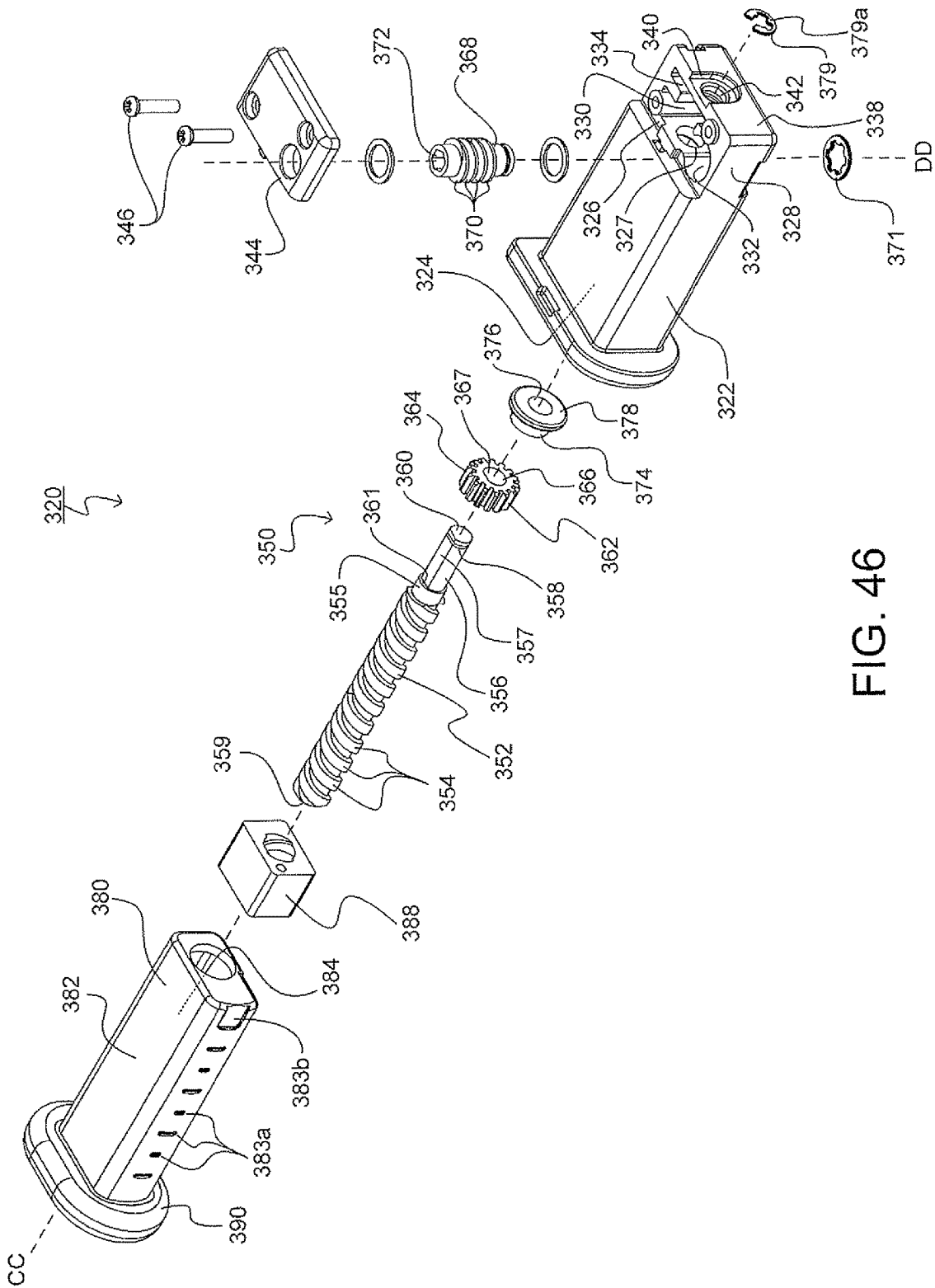
FIG. 46 illustrates an exploded view of another exemplary linear actuator extension.

FIGS. 46-55 depict another exemplary linear actuator extension 320. FIG. 46 illustrates an exploded view of the linear actuator extension 320 having a base housing 322, driving member 350 and driven member 380. Generally, the driving member 350 includes a threaded lead screw 352, a worm gear 362, a worm 368, a driving surface 372, a bushing 374 and a retaining clip or clamp 379. The linear actuator extension 320 incorporates many of the features and functionality previously described throughout the present disclosure.

During installation of the barrier assembly 10 that incorporates the linear actuator extension 320, a user will engage the driving surface 372 to rotate the worm 368. Spiral teeth 370 of the worm 368 propel teeth 364 of the worm gear 362, which in turn drives or rotates the threaded lead screw 352. As threads 354 of the threaded lead screw 352 engage internal threads of the lead screw nut 388, the driven member 380 will extend away from the base housing 322. This effectively increases a length of the linear actuator extension 320 and creates pressure between the frame 14 of the barrier assembly 10 and a wall or fixture to keep the barrier assembly 10 fixed in place.

Furthermore, an advantage of the linear actuator extension 320 is that the driving member 350 will secure and fix the length of the linear actuator extension 320 and withstand internal compression forces that exist throughout the linear actuator extension 320, as will be described in greater detail below.

Figures 47, 48:
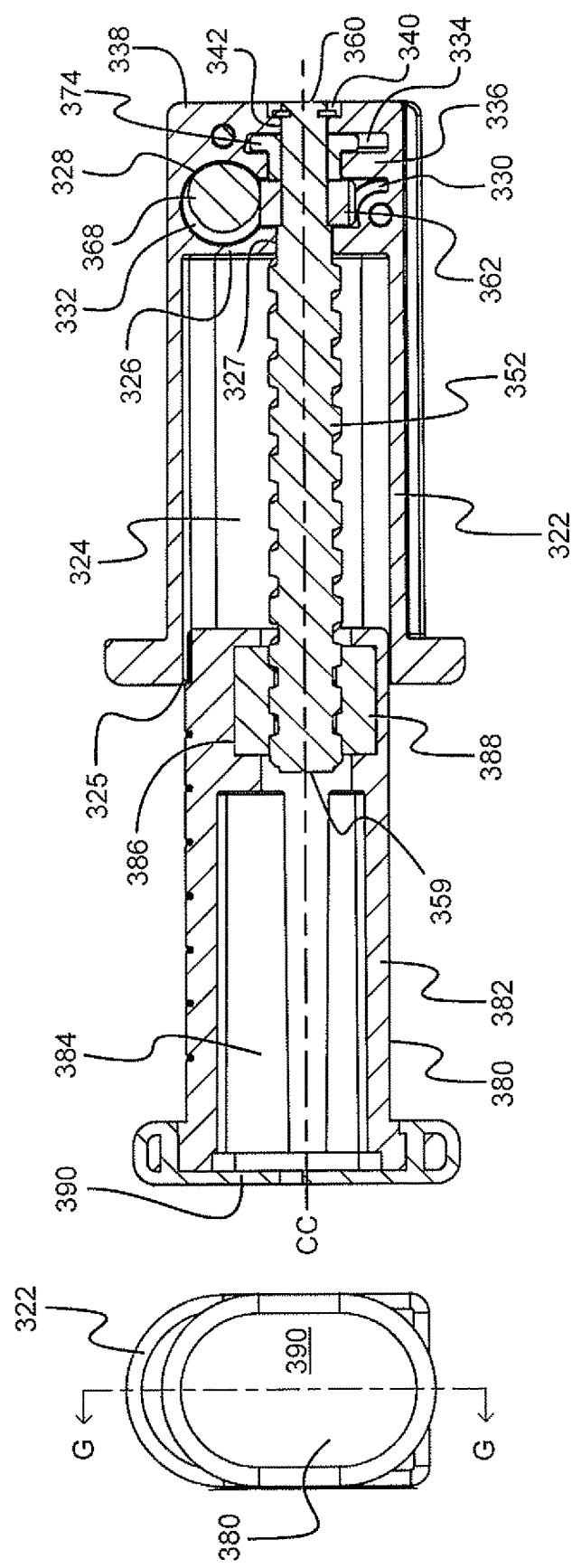
FIG. 47 depicts a left side view of the linear actuator extension.
FIG. 48 shows a cross section view of the linear actuator extension in an extended position about line G-G in FIG. 47.

FIG. 48 shows a cross section view of the linear actuator extension in an extended position about line G-G in FIG. 47. FIGS. 46 and 48 illustrate that base housing 322 has a first internal compartment 324, intermediary wall 326, second internal compartment 328, rear wall 338 and a cover 344. The first internal compartment 324 includes an opening 325 disposed at an end opposite of the intermediary wall 326 and second internal compartment 328. Generally, the first internal compartment 324 lies along an axis CC defined as a center of a threaded lead screw 352 running from a center of a first end 359 to a center of a second end 360. The intermediary wall 326 is disposed within the base housing 322 between the first internal compartment 324 and the second internal compartment 328. The intermediary wall 326 includes a through-hole or aperture 327, which may be adapted to receive and permit free rotational movement of the threaded lead screw 352.

The second internal compartment 328 may include a gear recess 330, a worm recess 332, a bushing recess 334 and an internal support wall 336. The gear recess 330 may be disposed between the intermediary wall 326 and the rear wall 338 of the base housing 322, and is adapted to receive and house the worm gear 362. The worm recess 332 may be disposed adjacent to the gear recess 330, or be incorporated together as a single recess defined within the second internal compartment 328, and is adapted to receive and secure the worm 368. As will be described in greater detail below, the worm recess 332 permits rotational movement of the worm 362 and allows the worm 362 to engage the worm gear 362. The bushing recess 334 may be disposed between the gear recess 330 and the rear wall 338 and receives and secures the bushing 374. The internal support wall 336 may be provided to further support the threaded lead screw 352, the worm gear 362 and bushing 374.

The rear wall 338 of the base housing 322 may include a recessed portion 340 having a through-hole or aperture 342. The through-hole 342 may receive and secure a portion of the threaded lead screw 352, as will be described in greater detail herein below, and permit rotational movement thereof while restricting movement of the threaded lead screw 352 in directions orthogonal to the axis CC.

Figures 49, 50:
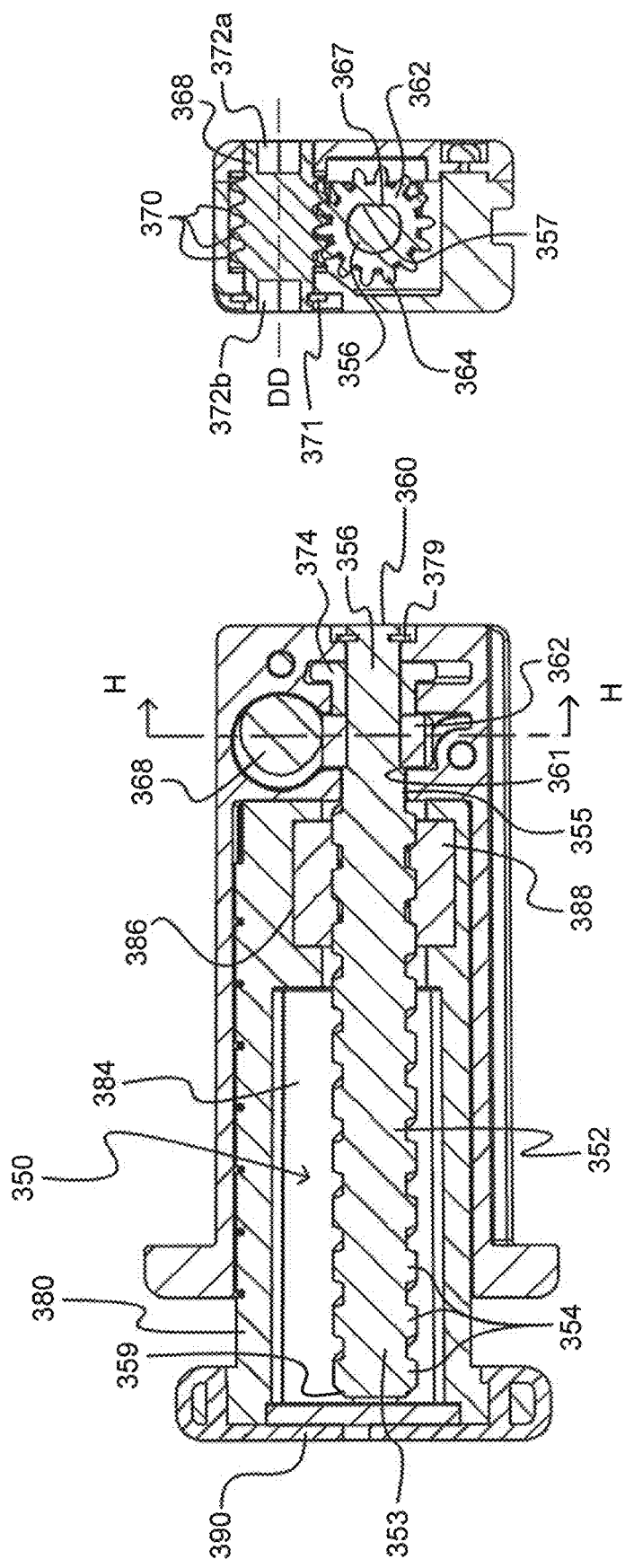
FIG. 49 illustrates a cross section view of the linear actuator extension in a retracted position about line G-G in FIG. 47.
FIG. 50 depicts a cross section view of the linear actuator extension about line H-H in FIG. 49.

FIG. 49 depicts a cross section view of the linear actuator extension in a retracted position about line G-G in FIG. 47. FIGS. 46 and 49 further illustrates the driving member 350 including the threaded lead screw 352, the worm gear 362, the worm 368, the driving surface 372, the bushing 374 and the clamp 379. The threaded lead screw 352 has a first shaft portion 353, a second shaft portion 356, a first end 359 and a second end 360. The first shaft portion 353 includes threads 354 and a smooth, cylindrical surface 355 disposed between the threads 354 and the second shaft portion 356. The cylindrical surface 355 may rest within the through-hole 327 when the threaded lead screw 352 is in an installed position within the linear actuator extension 320. An outer diameter of the first shaft portion 353, which is also a minor diameter of the threads 354, may be greater than an outer diameter of the second shaft portion 356 to form a radial platform 361. However, it is to be understood that the first and second shaft portion 353, 356 may have any size and shape suitable to allow for the extension of the linear actuator extension 320.

The second shaft portion 356 may be in the form of a rear extending shaft portion, shank or grip 356 having a generally cylindrical body with a flat face or keying edge 357. The second end 360 of the threaded lead screw 352 may be disposed on the second shaft portion 356 and include a concentric groove 358, which is adapted to receive the clamp 379. The clamp 379 may be generally C-shaped or E-shaped, having slight protrusions 379a that grip an inner surface of the concentric groove 358. The clamp 379 changes a greatest outer diameter of the second end of the threaded lead screw such that the greatest outer diameter is larger than an inner diameter of the through-hole 342 in the rear wall and restricting the threaded lead screw 352 from moving transversely along axis CC and securing the threaded lead screw 352 into position.

FIG. 50 shows a cross-section view through the worm 368 and worm gear 362. The worm gear 362 has teeth 364 and a central hole or aperture 366. The hole 366 includes a flat face or keying edge 367 that complements the second shaft portion 356 and keying edge 357 of the threaded lead screw 352. When the worm gear 362 matingly receives the second shaft portion 356, a cross-sectional profile of the second shaft portion 356 is aligned with a cross-sectional profile of the hole 366. Therefore, when the worm gear 362 rotates, the hole 366 lockingly engages with the second shaft portion 356 and the threaded lead screw 352 rotates by a substantially similar degree of rotation.

The worm 368 includes spiral teeth 370 that engage teeth 364 of the worm gear 362. The worm 368 comprises the driving surface 372. The driving surface 372 may include a first driving surface 372a and a second driving surface 372b. In this configuration, a user may engage either the first driving surface 372a on a first side of the linear actuator extension 320 or the second driving surface 372b on a second side of the linear actuator extension 320 in order to extend or retract the driven member 380. It is to be understood that the worm 368 may be actuated manually or automatically, though the use of a manual driver or automatic motor, or other suitable method for rotating the worm 368.

An axis DD of the worm 368 is positioned orthogonal to an axis of the worm gear 362, which is aligned with the axis CC. In particular, a first unit vector of axis DD is perpendicular or orthogonal to a second unit vector of axis CC. When a user rotates the driving surface 372, the worm 368 will rotate and cause the spiral teeth 370 to propel the teeth 364 and thus rotate the worm gear 362 about its axis CC.

Referring back to FIG. 46, the bushing or washer 374 is provided along the threaded lead screw 352 and may be disposed between the worm gear 362 and the rear wall 338 of the base housing 322. The bushing 374 may include a hole 376 adapted to receive a portion of the threaded lead screw and permit rotational engagement thereof. The bushing 374 may also include a radially extending flange 378. Furthermore, a self-locking retaining ring 371 may longitudinally fix the worm 368 but permit the rotational movement thereof. The spiral teeth 370 and the self-locking retaining ring 371 are disposed on either side of the base housing 322.

FIGS. 46-48 additionally depict the driven member 380 having a housing 382, a cavity 384, a lead screw nut 388 and a compression pad 390. The housing 382 is adapted to be received and secured by the first internal compartment 324 of the base housing 322 when the linear actuator extension 320 is in a retracted position. The cavity 384 is adapted to receive and house the threaded lead screw 352. While the cavity may be cylindrical and have an inner diameter that is substantially similar to a major diameter of the threads 354 of the first shaft portion 353, it may also take on any size or shape suitable to receive the threaded lead screw 352.

The cavity may also comprise an internal recess 386 that secures the lead screw nut 388. The internal recess 386 longitudinally fixes the lead screw nut 388 to the housing 382. As such, when the threaded lead screw 352 rotates with respect to the lead screw nut 388, the lead screw nut 388 and the driven member 380 will longitudinally translate along axis CC.

While the linear actuator extension 320 is in use and in an extended position between a wall and a frame of a barrier assembly, normal directed forces will compress the compression pad 390. In turn, the threaded lead screw 352 will be under a compression force between the first end 359 and second end 360. The threaded lead screw 352 may then distribute the compression force from the radial platform 361, through the worm gear 362, to the bushing 374. The bushing 374 may then spread the force about an enlarged flat surface defined by the flange 378.

The threaded lead screw 352 may also apply lateral forces against the base housing 322 at the through-hole 327 and through-hole 342, the worm gear 362, and the bushing 374. The bushing 374 may then translate those forces against the second internal compartment 328 or cover 344. A stress against an internal surface of the cover 344 is thereby lessened because the threaded lead screw 352 distributes the forces amongst multiple internal surfaces of the base housing 322.

During assembly of the driving member 350, worm 368, worm gear 362 and bushing 374 are inserted into the worm recess 332, gear recess 330 and bushing recess 334 respectively. Self-locking retaining ring 371 is then connected to the worm 368 to attach the worm 368 to the base housing 322. Then, the threaded lead screw 352 is inserted into the opening 325, through the first internal compartment 324 and through aperture 327. The flat face 357 of the threaded lead screw is then aligned with the flat face 367 of the worm gear 362 and the second shaft portion 356 is inserted through the hole 366. The threaded lead screw is then inserted though hole 376 of bushing 374 and aperture 342 of the rear wall 338. Retaining clip or clamp 379 then is connected to the second shaft portion 356 by way of the concentric groove 358. Cover 344 may then be fastened over the second internal compartment 328 with screws or fasteners 346.

Figure 51:
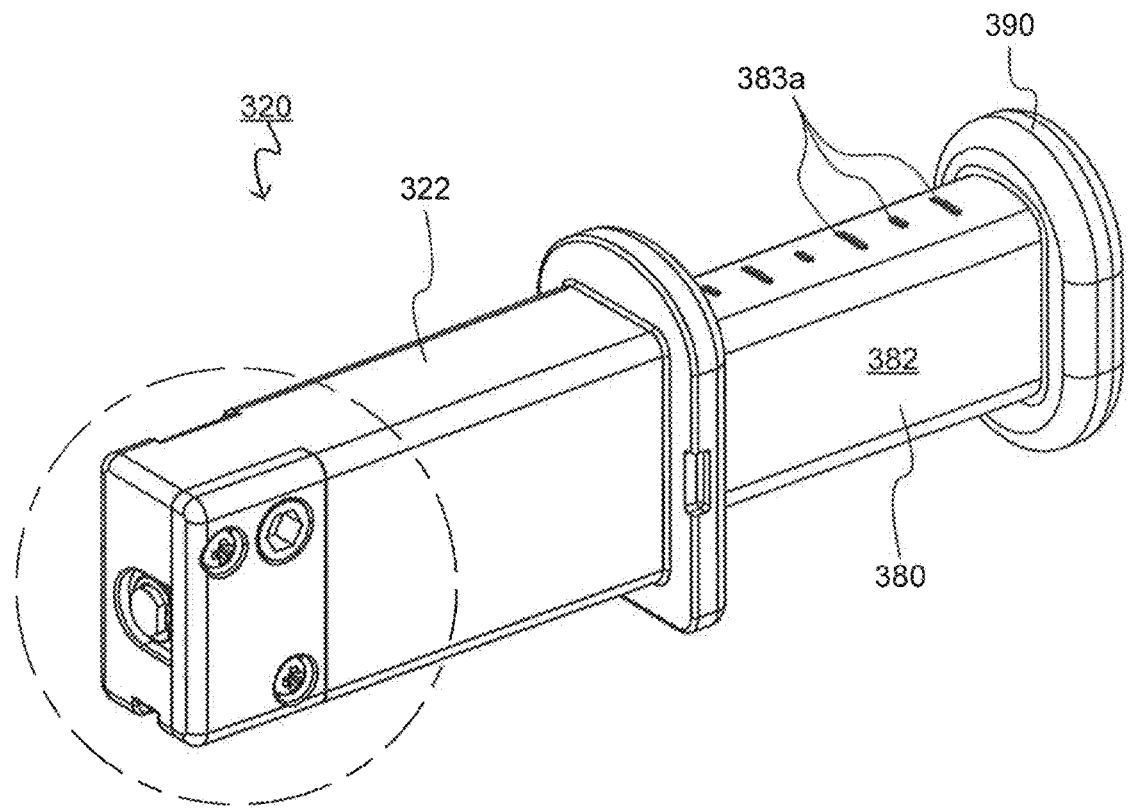
FIG. 51 shows a perspective view of the linear actuator extension in the extended position.

FIG. 51 shows a perspective view of the linear actuator extension 320 in the extended position. The driven member 380 may further include reference notches 383a provided at predetermined distances apart and away from the compression pad 390. The reference notches 383a measure a distance between the compression pad 390 and the base housing 322. For each distance the linear actuator extension is extended, a particular number of reference notches 383a will be visible, or disposed outside of the base housing 322. A user may quickly install the barrier assembly 10 by extending the linear actuator extension 320 until the appropriate number of reference notches 383a is visible for their particular use.

Figure 52:
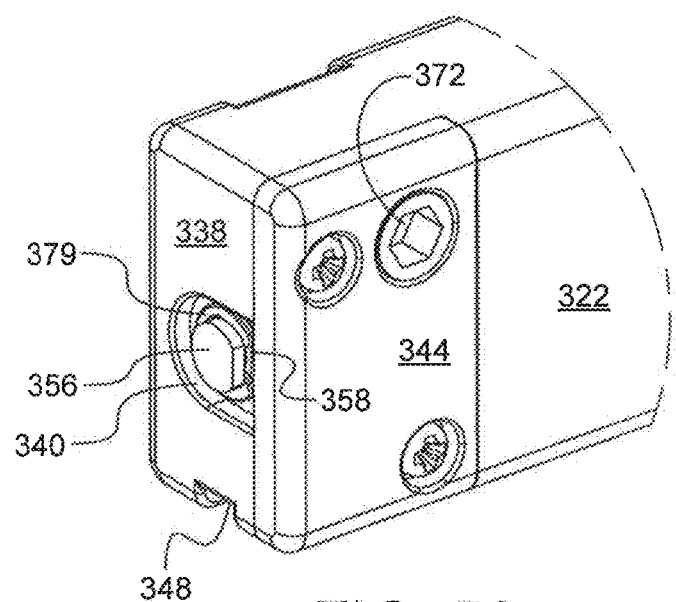
FIG. 52 illustrates an enlarged perspective view of the linear actuator extension in the extended position.

FIG. 52 illustrates an enlarged perspective view of the linear actuator extension. As previously described, the retaining clip or clamp 379 grips the concentric groove 358 of the second shaft portion 356, the second shaft portion 356 being flush with the rear wall 338. It is to be understood that any clamp may be used suitable for fixing the longitudinal movement of the threaded lead screw 352 towards the driven member 380. In addition, the second shaft portion 356 may be flush with the rear wall 338, as shown in FIGS. 53-55.

Furthermore, the base housing 322 may have a groove 348 provided on an outer surface thereof for aligning the linear actuator extension 320 into the frame 14 of the barrier assembly 10. The groove 348 may be disposed on a bottom surface, first or second side surfaces or top surface thereof.

Figure 55:
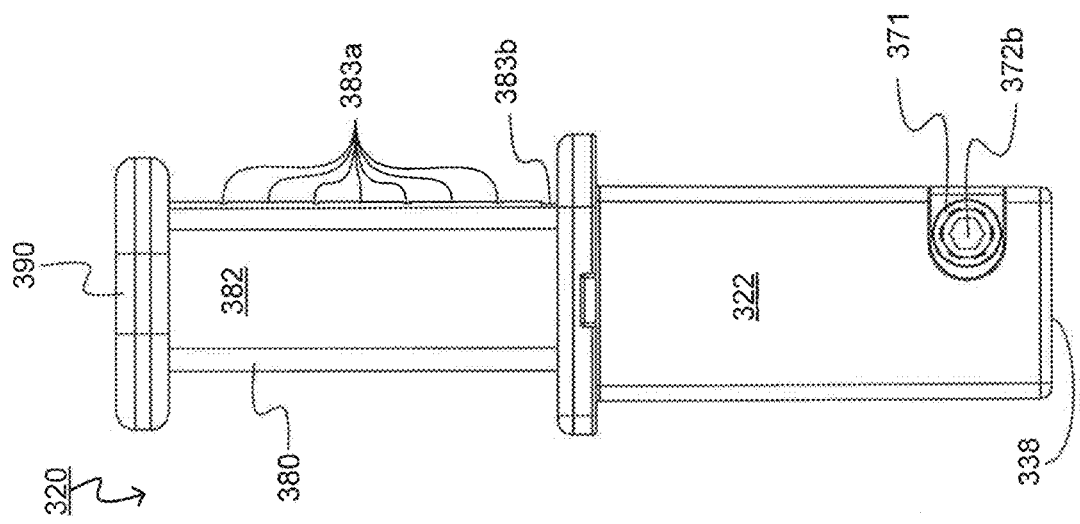
FIG. 55 illustrates a rear view of the linear actuator extension.
Figure 54:
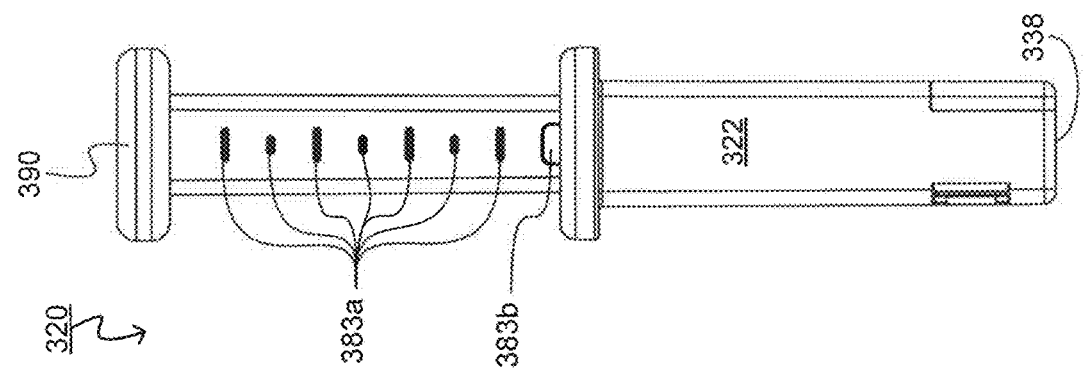
FIG. 54 shows a bottom view of the linear actuator extension.
Figure 53:
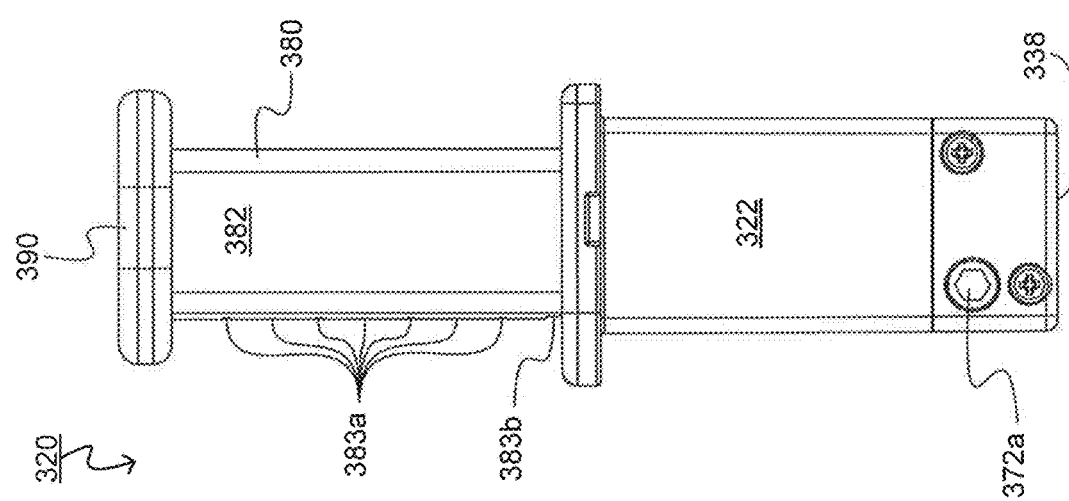
FIG. 53 depicts a front view of the linear actuator extension.

FIGS. 53-55 depict a front, bottom and side view respectfully of the linear actuator extension in a maximum extended position. The driven member 380 may have a visual stop indicator 383b provided on an outer surface of the housing 382. When the driven member 380 is extended to a maximum distance, the visual stop indicator 383b will signal to the user that the driven member 380 has reached the maximum distance. The visual stop indicator 383b may have a different color than a first color of the housing 382.

As shown, the reference notches 383a and the visual stop indicator 383b may be recessed into the outer surface of the housing 382, but it is to be understood that they may be flush with the outer surface and contrast in color or shape, or may be projections that extend above the outer surface. Alternatively, the reference notches 383a and the visual stop indicator 383b may also provide a tactile or audible feedback if in the form of a series of projections when an outer surface of those projections engages an inner edge of the opening 325 of the base housing 322. In addition, the visual stop indicator 383b may be constructed to retain the driven member 380 from further extension.

The illustrations and examples provided herein are for explanatory purposes and are not intended to limit the scope of the appended claims. It will be recognized by those skilled in the art that changes or modifications may be made to the above described embodiment without departing from the broad inventive concepts of the invention. It is understood therefore that the invention is not limited to the particular embodiment that is described, but is intended to cover all modifications and changes within the scope and spirit of the invention.

What is claimed is:

1. A barrier assembly, comprising:
   a barrier having a frame; and
   at least one linear actuator extension attached to the frame, comprising:
      a worm drive having a worm gear and a driving surface, and a given length;
      a driving member having a threaded lead screw;
      a driven member having a housing;
      a base housing having a given width, the base housing disposed within the frame, wherein the length of the worm drive fits within the width of the base housing; and
      an aperture disposed within the base housing,
      wherein the worm drive and the driving member are enclosed within the aperture of the base housing, such that rotating the driving surface of the worm drive about a first axis within the base housing causes the worm gear to rotate teeth on the threaded lead screw to rotate the threaded lead screw about a second axis substantially orthogonal to the first axis, and wherein the rotation of the threaded lead screw translates the housing of the driven member along the second axis within the base housing.

2. The barrier assembly as recited in claim 1, wherein the driving surface is rotated to rotate the worm gear along the first axis, spiral teeth on the worm gear engage and rotate the teeth on the threaded lead screw, which in turn rotates the threaded lead screw along the second axis, which causes a threaded portion integrated to the housing of the driven member to move the driven member away from the base housing.

3. The barrier assembly as recited in claim 1, wherein the housing of the driven member has an internal threaded portion that threadedly engages with the threaded lead screw to translate the housing along the second axis.

4. The barrier assembly as recited in claim 3, wherein the internal threaded portion is disposed on a lead screw nut that is received by an internal cavity of the driven member housing.

5. The barrier assembly as recited in claim 3, wherein the housing of the driven member further has a cavity that receives the threaded lead screw.

6. The barrier assembly as recited in claim 1, wherein the driven member has a compression pad.

7. The barrier assembly as recited in claim 1, wherein the base housing has a first and second internal compartment separated by an intermediary wall.

8. The barrier assembly as recited in claim 7, wherein the first internal compartment of the base housing receives the housing of the driven member.

9. The barrier assembly as recited in claim 8, wherein the second internal compartment houses the worm drive that defines the driving surface on a first end thereof, centered about the first axis, and a geared portion of the threaded lead screw having threads that project radially outwards from the second axis.

10. The barrier assembly as recited in claim 7, wherein the intermediary wall defines an aperture that receives and secures a portion of the threaded lead screw.

11. The barrier assembly as recited in claim 1, further comprising at least one visual indicator disposed on the driven member for measuring an overall length of the linear actuator extension assembly.

12. A barrier assembly, comprising:
a barrier having a frame; and
at least one linear actuator extension attached to the frame, comprising:
 a worm drive having a worm gear and a driving surface, and a given length;
 a driving member having a threaded lead screw;
 a driven member having a housing;
 a base housing having a given width, the base housing disposed within the frame, wherein the length of the worm drive fits within the width of the base housing; and
 an aperture defined in the base housing;
 wherein the worm drive and the driving member are enclosed within the aperture of the base housing, such that rotating the driving surface of the worm drive about a first axis within the base housing causes the worm gear to rotate teeth on the threaded lead screw to rotate the threaded lead screw about a second axis, and wherein the rotation of the threaded lead screw translates the housing of the driven member along the second axis within and relative to the base housing.

13. The barrier assembly as recited in claim 12, wherein a first unit vector of the first axis is perpendicular to a second unit vector of the second axis.

14. The barrier assembly as recited in claim 12, further comprising a second driving surface disposed on an opposite end of the worm drive in relation to the first driving surface.

15. The barrier assembly as recited in claim 12, wherein the at least one linear actuator extension has an extended position and a retracted position, in the retracted position an internal compartment of the base housing receives the housing of the driven member.

16. The barrier assembly as recited in claim 12, wherein the base housing defines a first internal compartment, an intermediary wall, a second internal compartment and a rear wall, the intermediary wall having a first through-hole and the rear wall having a second through-hole that receive a first and second portion of the threaded lead screw respectively.

17. The barrier assembly as recited in claim 12, wherein in an installed position, internal compression forces within the linear actuator extension are distributed between the driven member, the threaded lead screw and the base housing.

18. A barrier assembly, comprising:
a barrier having a frame; and
at least one linear actuator extension attached to the frame, comprising:
 a worm drive having a worm gear and a driving surface, and a given length;
 a driving member having a threaded lead screw defining a first central axis; and
 a driven member having a housing and a threaded portion that engages the threaded lead screw,
 wherein the worm drive and a portion of the driving member are disposed within an aperture disposed in a base housing having a given width that is enclosed and disposed within the frame, wherein the length of the worm drive fits within the width of the base housing, such that a rotation of the driving surface of the worm drive within the base housing about a second central axis drives a rotation of the threaded lead screw about the first central axis to linearly translate the portion of the driven member along the first central axis within the base housing.

* * * * *